United States Patent
Stein (10) Patent No.: US 7,546,129 B2
(45) Date of Patent: *Jun. 9, 2009

(54) METHOD AND APPARATUS FOR DETECTING EXCESS DELAY IN A COMMUNICATION SIGNAL

(75) Inventor: Jeremy M. Stein, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 11/186,450

(22) Filed: Jul. 20, 2005

(65) Prior Publication Data

US 2005/0255858 A1    Nov. 17, 2005

Related U.S. Application Data

(63) Continuation of application No. 09/954,699, filed on Sep. 14, 2001, now Pat. No. 6,941,144.

(51) Int. Cl.
*H04M 11/04* (2006.01)
*H04Q 7/20* (2006.01)

(52) U.S. Cl. .......... 455/456.1; 455/456.5; 455/404.2

(58) Field of Classification Search .......... 455/456.1, 455/456.5, 456.6, 457, 422.1, 432.1, 435.1, 455/404.2; 342/107, 108, 378, 450, 458
See application file for complete search history.

(56) References Cited

U.S. PATENT DOCUMENTS 5,293,645 A    3/1994    Sood
5,890,068 A    3/1999    Fattouche
5,982,324 A * 11/1999    Watters et al.    ......... 342/357.06

(Continued)

FOREIGN PATENT DOCUMENTS

EP    1014103    6/2000

(Continued)

OTHER PUBLICATIONS

Cellular position location techniques a parameter detection approach Estrada, R.; Munoz-Rodriguez, D.; Molina, C.; Basu, K.; Vehicular Technology Conference, 1999 IEEE 49th vol. 2, May 16-20, 1999 pp. 1166-1171 vol. 2 , Digital Object Identifier 10.1109/VETEC.1999. 780531.*

(Continued)

*Primary Examiner*—Sonny Trinh
(74) *Attorney, Agent, or Firm*—Donald C. Kordich; Linda G. Gunderson (57) ABSTRACT

A method and apparatus of determining a lower bound of an excess delay in a time of arrival measurement of a received signal. Determining the lower bound of an excess delay in a time of arrival measurements includes receiving signals from at least two base stations and determining the time difference of arrival between the received signals from their respective base stations. Then estimating a lower bound of excess delay introduced into the signals received from the base stations based on the time of arrival of the signals from the respective base stations and a known distance between the base stations. The lower bound of excess delay may be used to adjust the estimate of a mobile unit's location based on the time of arrival measurements of the received signals.

36 Claims, 9 Drawing Sheets

U.S. PATENT DOCUMENTS

| | | | |
|---|---|---|---|
| 6,154,657 A * | 11/2000 | Grubeck et al. | 455/456.2 |
| 6,184,829 B1 | 2/2001 | Stilp | |
| 6,201,803 B1 | 3/2001 | Munday et al. | |
| 6,204,812 B1 * | 3/2001 | Fattouche | 342/457 |
| 6,208,297 B1 * | 3/2001 | Fattouche et al. | 342/450 |
| 6,266,014 B1 * | 7/2001 | Fattouche et al. | 342/450 |
| 6,308,073 B1 | 10/2001 | Petty et al. | |
| 6,330,452 B1 * | 12/2001 | Fattouche et al. | 455/456.1 |
| 6,405,047 B1 | 6/2002 | Moon | |
| 6,556,832 B1 * | 4/2003 | Soliman | 342/456.5 |
| 6,671,514 B1 | 12/2003 | Cedervall et al. | |
| 6,697,417 B2 * | 2/2004 | Fernandez-Corbaton et al. | 375/147 |
| 6,748,224 B1 | 6/2004 | Chen et al. | |
| 6,804,494 B2 | 10/2004 | Fernandez-Corbaton et al. | |
| 6,941,144 B2 | 9/2005 | Stein | |

FOREIGN PATENT DOCUMENTS

| | | |
|---|---|---|
| JP | 2000-180186 | 6/2000 |

OTHER PUBLICATIONS

Cramer-Rao bound for location estimation of a mobile in asynchronous DS-CDMA systems Botteron, C.; Host-Madsen, A.; Fattouche, M.; Acoustics, Speech, and Signal Processing, 2001. Proceedings. (ICASSP '01). 2001 IEEE International Conference on vol. 4, May 7-11, 2001 pp. 2221-2224 vol. 4 Digital Object Identifier 10.1109/ICASSP.2001.940439.*

James Caffery Jr, et al., "Subscriber Location in CDMA Cellular Networks", IEEE vol. 47, No. 2, May 1998 pp. 404-416.

G. D. Morley et al. "Improved Location Estimation with Pulse-Ranging in Pressence of Shadowing and Multipath Excess-Delay Effects", Aug. 31, 1995.

Botteron, C, et al., "Cramer-Rao bound for location estimation of a mobile in asynchronous DS-CDMA systems" Acoustics, Speech, and Signal Processing (ICASSP '01) 2001 IEEE International Conference, vol. 4.

Thomas N.J. Cruickshank et al., "Calculation of mobile location using scattered information", Electronics Letters, IEEE, Sep. 13, 2001. vol. 37, pg. 1193.

International Search Report-PCT/US02/028679, International Search Authority, European Patent Office, Jun. 18, 2008.

International Preliminary Examination Report - PCT/US02/028679 - IPEA, US - Sep. 9, 2004.

* cited by examiner

METHOD AND APPARATUS FOR DETECTING EXCESS DELAY IN A COMMUNICATION SIGNAL

RELATED APPLICATIONS

This application is a continuation of U.S. patent application Ser. No. 09/954,699, filed on Sep. 14, 2001 now U.S. Pat. No. 6,941,144.

BACKGROUND OF THE INVENTION

1. Field of the Invention

The invention relates to estimating a mobile unit's location using time difference of arrival (TDOA) of communication signals. In particular, the invention relates to adjusting the estimated location of the mobile unit in a cellular communication system using TDOA.

2. Description of the Related Art

Recently there has been a great deal of interest in determining the location of mobile devices. One area that is of particular interest is the ability to determine the location of cellular phone users in certain circumstances. For example, the U.S. Federal Communication Commissions (FCC) has mandated that the location of a cellular user be determined when the user dials 911. In addition to the FCC mandate, it is envisioned that other applications that can take advantage of knowing a user's location will be developed.

Various techniques have been used to determine the location of a mobile unit. For example, the Global Positioning System (GPS) is a satellite system that provides users equipped with a GPS receiver the ability to determine their location anywhere in the world. While GPS provides world wide coverage, it suffers from several drawbacks. One such drawback to the GPS system is that in general a user must have a clear view of four GPS satellites to accurately determine their location. For a cellular user this can be a significant hindrance to the use of GPS because many cellular users are in urban areas where objects, such as tall buildings, may shadow the user so that they are unable to see the required number of satellites. The problem is further exacerbated when the cellular user is indoors in a building.

Other techniques have been developed that attempt to exploit some of the characteristics of the cellular system itself to aid in the determination of the location of a mobile unit. One such technique is the Time Difference of Arrival (TDOA) technique. The TDOA technique can be used when the actual transmission times of received signals is known, or when the transmission of the received signal occurs at a known periodic rate. For example, if a mobile unit receives signals that are transmitted from at least two base stations, and the signals are transmitted by the base stations at the same time, or the signals are synchronized to each other, the mobile unit will be able to determine the relative difference in time that the two signals are received. The differences in time that the two signals are received corresponds to the difference the distance traveled by each signal from the respective base station to the mobile unit.

The TDOA between two signals establishes a set of points that maintain the constant time difference, and corresponding travel distance, between the received signals. The set of points defines a hyperbolic surface representing possible locations of the mobile unit. By making multiple, simultaneous, TDOA measurements a family of surfaces can be generated with the intersection of these surfaces providing an estimate of the location of the mobile unit.

A problem can arise when using the TDOA technique if the signal received by the mobile unit has been delayed. For example, in a typical wireless communication system, a signal emitted from a base station reflects off surfaces, creating multiple instances of the signal that may travel several distinct paths as they propagate through the wireless channel between the base station and a mobile unit. This phenomenon is commonly referred to as multipath. Each of the multipaths traveled by the signal instances is typically a different distance than the other paths, resulting in the multipath signals being received at different times from each other, as well as being delayed from the time that a direct line-of-sight signal would arrive at the mobile unit. The direct line-of-sight signal represents the actual distance from the base station to the mobile unit.

In the wireless channel, the multipath is created by reflection of the signal from obstacles in the environment such as, for example, buildings, trees, cars, and people. Accordingly, the wireless channel is generally a time varying multipath channel due to the relative motion of the mobile unit and structures that create the multipath. Thus, the amount of delay of the received signal is also time varying.

The multipath characteristics of a channel can also affect the signal received by the mobile unit in other ways, resulting in, among other things, attenuation of the signal in addition to excess delay of the signal. Attenuation in the signal strength results from, among other things, energy from the signal being absorbed as the signal propagates through the medium and is reflected off objects. In addition, the signal received at a mobile unit is attenuated due to geometric spreading of the signal as it propagates through the wireless channel.

Excess delay is the difference between the time it takes the signal to travel a multipath route from the base station to the mobile unit and the time it would have taken if the signal had traveled a direct line-of-sight path between the base station and the mobile unit. For example, there may be no direct line-of-sight path between the base station and the user because, for example, the user is shadowed from the base station by a building. In this situation the signal received at the mobile unit will travel a distance greater that the actual line-of-sight distance between the base station and the mobile unit because the signal will have to be reflected off objects to "get around" the obstruction and reach the mobile unit. The increase in distance traveled by the signal introduces additional, or excess, delay into the time of arrival of the signal, resulting in an error in the TDOA measurement, increasing the inaccuracy of the estimated location of the mobile unit.

Excess delay can also be introduced even if there is a direct line-of-sight path between the base station and the mobile unit. For example, the signal received from the direct line-of-sight path may be attenuated such that it is not sufficiently strong to permit the mobile unit to make a timing measurement. Therefore, one of the multipath instances of the signal will be the first signal received by the mobile unit with sufficient strength to allow a timing measurement to be made.

Due to these and other problems, signals in a typical communication system, particularly ones operating in a multipath environment, experience excess delay, thereby increasing the inaccuracy in location estimates made using the TDOA technique. Therefore, there is a need to improve the reliability of TDOA measurements and the associated location estimate.

SUMMARY OF THE INVENTION

A method and apparatus in accordance with the invention determines a lower bound of excess delay in a time of arrival measurement of a received signal, thereby constraining the TDOA measurement and improving the reliability of the location estimate. Determining the lower bound of an excess delay in a time of arrival measurement by a mobile unit includes receiving a signal from a first base station and a signal from a second base station and determining the time difference of arrival between the received signals from the respective base stations, then estimating a minimum value for the delay introduced into the time of arrival of the signals received from each base station based on the time difference of arrival between the signals from the respective base stations and the known distance between the base stations. The lower bound of the excess delay may be used to adjust the estimate of a mobile unit's location using the time difference of arrival measurements of the received signals. The adjusted TDOA is used to perform location calculations, for example, depending on the value of the lower bound of the excess delay and the number of available TDOA measurements, the TDOA measurement could be corrected, weighted differently in the location estimate solution, or discarded from the location estimate solution. In addition, the lower bound of excess delay can be used as an indication of the accuracy of the location estimate.

The processing to determine the location estimate can be dispersed to, or located in, various devices in the cellular network. In one embodiment, determining the lower bound of excess delay and the location estimate of the mobile unit are both performed by the mobile unit. In another embodiment, the lower bound of excess delay is determined by the mobile unit and the value of the lower bound of excess delay is transmitted to a different location where an estimate of the mobile unit location is performed. In yet another embodiment, the times of arrival of signals received by the mobile unit from at least two base stations are transmitted to a different location and the lower bound of excess delay is determined and an estimate of the mobile unit location is performed. For example, the different location may be a base station, a mobile switching center, or some other component of the cellular infrastructure.

In one embodiment the adjustment of the estimate of a mobile unit's location includes subtracting the lower bound of excess delay from the actual time of arrival measurements used to determine the time difference of arrival, to produce a corresponding distance adjustment. In another embodiment, the adjustment includes weighting the time difference of arrival measurements, according to the lower bound of excess delay for their associated time of arrival measurements, to adjust the estimated location. In another embodiment, the adjustment includes eliminating a time difference of arrival measurement from the location estimate based on the lower bound of excess delay of its associated time of arrival measurements. In yet another embodiment, the lower bound of excess delay for the received signals is used to determine the accuracy of a location determination estimate of a mobile unit.

The determination of the lower bound of excess delay may be used in a communication system that includes mobile units and base stations. In one embodiment, the communication system uses CDMA signals. In another embodiment, the communication system uses GSM signals.

In one embodiment, the signals received by the mobile unit used to determine the time of arrival may be transmitted from each base station at the same time. In another embodiment, the signals received by the mobile unit from the base stations are transmitted synchronized in time to each other. In another embodiment, signals received by the mobile unit are global positioning system (GPS) signals. In yet another embodiment, signals received by the mobile unit are from base stations and GPS in a hybrid system.

Other features and advantages of the present invention should be apparent from the following description of the preferred embodiment, which illustrates, by way of example, the principles of the invention.

DETAILED DESCRIPTION

Figure 1:
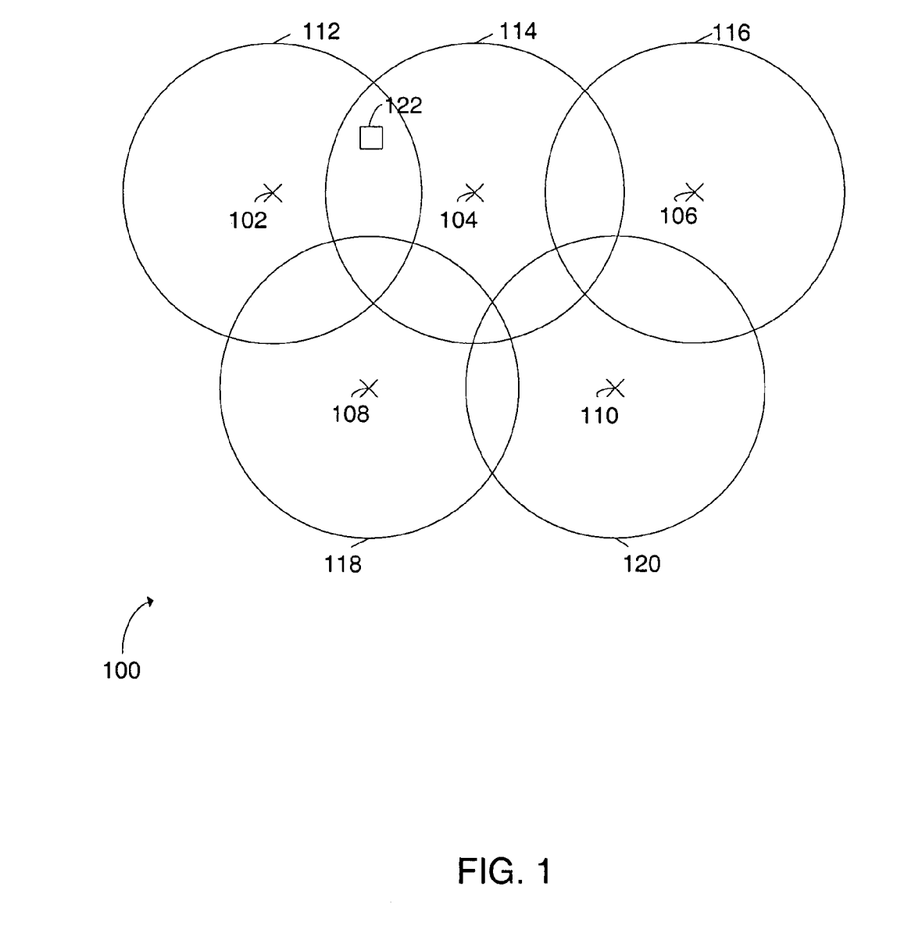
FIG. 1 is a plan view exemplifying a portion of a cellular network divided into a plurality of cells.

FIG. 1 is a plan view of a portion of an exemplary cellular network 100 divided into a plurality of cells. Illustrated in FIG. 1 are five base stations 102, 104, 106, 108, and 110, and their respective cells, or coverage areas 112, 114, 116, 116, 118, and 120. As used herein a base station refers to any transmitter whose location is known at the time of transmission. For example, the base stations could include cell towers of a cellular network, satellites, or other wireless infrastructure.

The base station coverage areas in FIG. 1 indicate the area around the base station where the base station will support communication over the cellular network. While communication over the cellular network is supported within the coverage area, pilot signals transmitted from a base station may be detected by the remote unit at locations outside the coverage area of the base station, and be used in estimating the location of the mobile unit.

In FIG. 1, the base station coverage areas are shown as circular for illustrative purposes only, and an actual coverage area may be of different shapes, including regular as well as irregular shapes. In addition, although all the cells illustrated in FIG. 1 are the same size, actual cells may be different shapes and sizes from each other.

A mobile unit 122 is shown in a region overlapped by two coverage areas 112 and 114. The mobile unit 122 moves through the cellular network 100, passing from the coverage area of one base station to another. As the mobile unit 122 moves through the cellular network 100 the mobile unit may be able to receive signals from more than one base station, as indicated in FIG. 1 by the regions where base station coverage areas overlap. For example, in FIG. 1 the mobile unit is located in a region where two base stations 102 and 104 and their respective coverage areas 112 and 114 overlap. While the mobile unit is located within this overlap region the mobile unit 122 is able to communicate over the cellular network with both base stations 102 and 104. Examination of FIG. 1 illustrates multiple regions where base station cover areas overlap. While the example shown in FIG. 1 only shows regions where a maximum of three base stations coverage areas overlap, in an actual cellular network there may be regions where any number of base station coverage areas may overlap.

In one embodiment, the mobile unit 122 may include an enhanced sensitivity receiver to increase the number of pilot signals transmitted by different base stations that may be detected. Thus, the area which a pilot signal from a single base station may be detected is larger than the area over which a base station may support standard cellular communications. For example, the mobile unit 122 may be able to detect a pilot signal transmitted by a base station, but other signals received from the base station may not be of sufficient strength to support communications such as voice traffic over the cellular network. For example, the mobile unit may be able to detect pilot signals from many base stations that are sufficient for use in estimating the mobile units location, but the mobile unit may be in the coverage areas of only a limited number of the base stations.

Figure 2:
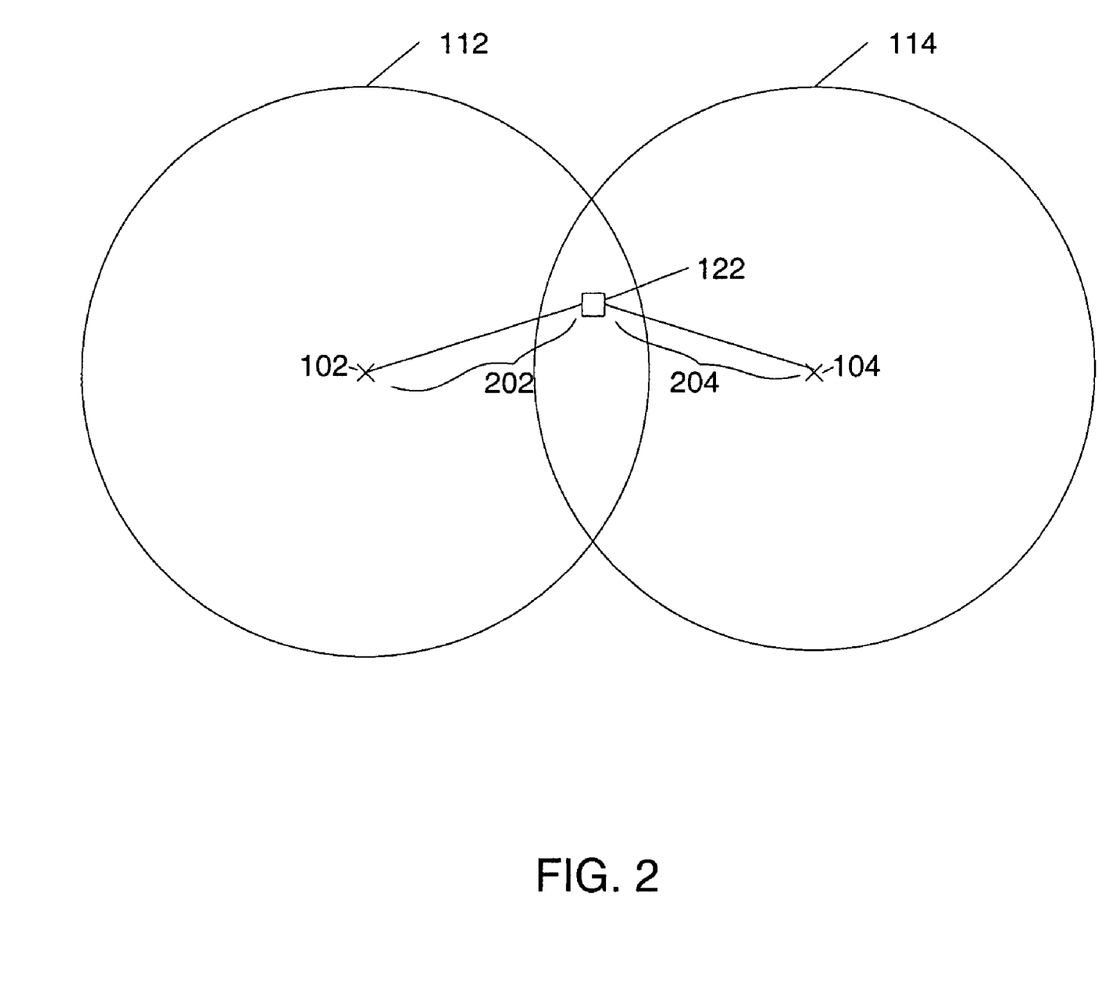
FIG. 2 is an expanded view of a portion of FIG. 1 illustrating additional detail of two base stations, their respective coverage areas, and a mobile unit.
Figure 3:
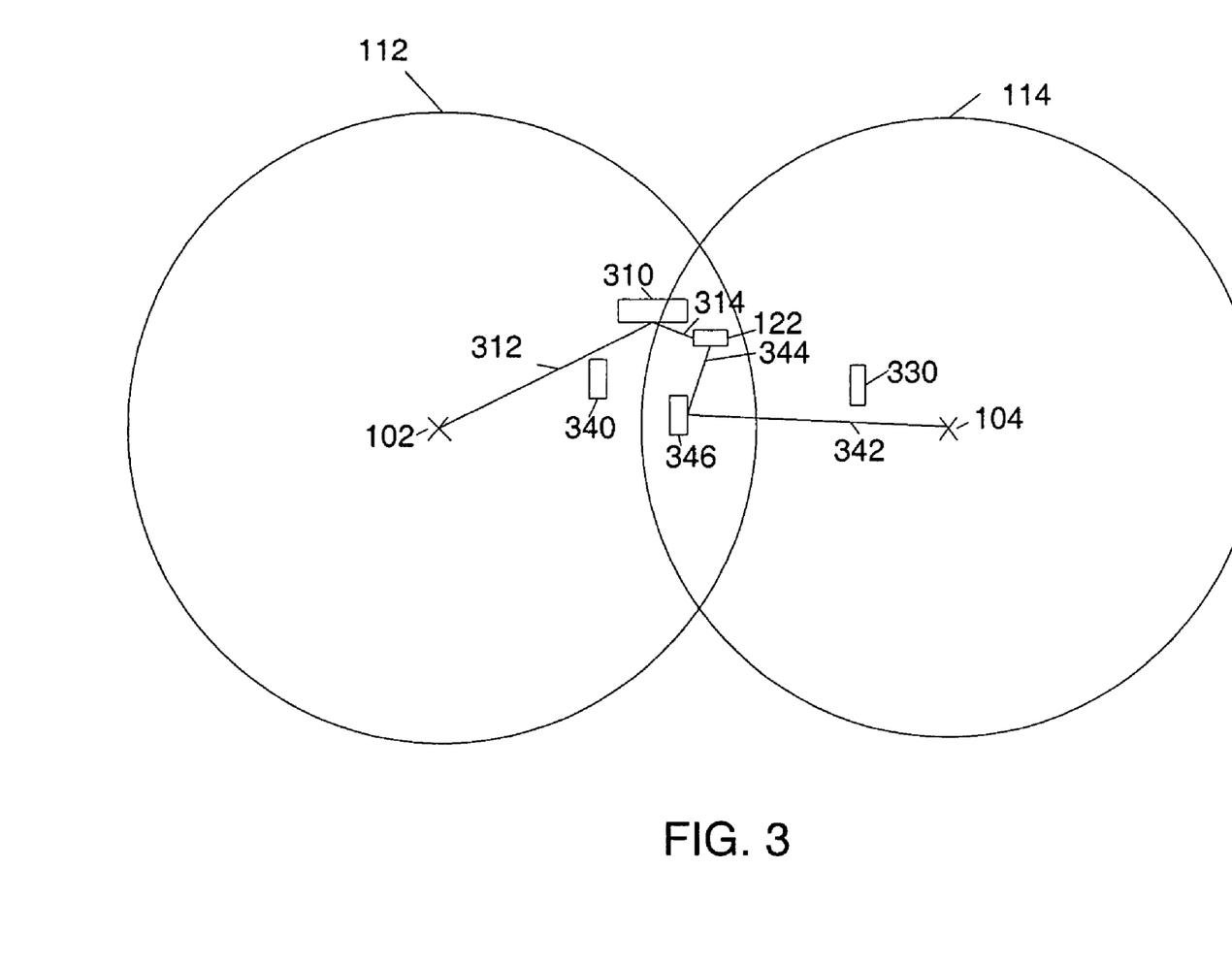
FIG. 3 is an expanded view of a portion of FIG. 1 illustrating additional detail of two base stations, their respective coverage areas, and a mobile unit.

FIGS. 2 and 3 are views showing an expanded region of two of the base stations 102 and 104 and their respective coverage areas 112 and 114, and the mobile unit 122, illustrating additional detail. FIG. 2 illustrates a very simple example where the direct line-of-sight path between the base stations and the mobile unit are not obstructed. As shown in FIG. 2, the actual, or line-of-sight, distance from the first base station 102 to the mobile unit 122 is represented by a first distance 202. The actual, or line-of-sight, distance between the second base station 104 and the mobile unit 122 is represented by a second distance 204. If there are no obstructions affecting the signals transmitted from the base stations 102 and 104 to the mobile unit 122, the transmitted signals would arrive at the mobile unit at a time, after being transmitted, equal to the line-of-sight distance between the respective base stations and the mobile unit, represented by 202 and 204 respectively divided by the speed of propagation of the signal through the wireless channel (the speed of light). In this case, there would be no excess delay because the signal traveled the actual line-of-sight distance between the base stations 102 and 104 and the mobile unit 122.

If the direct line-of-sight path is obstructed, or the direct line-of-sight signal is not usable, for example, due to attenuation, then the signals received by the mobile unit 122 will have to travel a different, longer, path and will have an associated delay. FIG. 3 illustrates an example where there is an obstruction, for example, a building or other object, that blocks the line-of-sight path from the base station to the mobile unit. For example, as shown in FIG. 3 there is a building or other object 340 located between the first base station 102 and the mobile unit 122. Because the object 340 blocks the direct line-of-sight path between the first base station 102 and the mobile unit, the first instance of the signal from the base station 102 to arrive at the mobile unit follows a different path from the line-of-sight path, for example, the path illustrated by lines 312 and 314. The signal path illustrated by lines 312 and 314 shows that the signal leaves the base station 102 and is reflected off an object 310 to the mobile unit 122.

Likewise, FIG. 3 illustrates another multipath example where an object 330 blocks the direct line-of-sight path between the second base station 104 and the mobile unit 122. Thus, the signal from the second base station 104 will not travel the direct line-of-sight path but will travel a different, longer, path to reach the mobile unit. For example, in FIG. 3 the path from the second base station 104 to the mobile unit is a reflected path involving an object 346 and is illustrated by lines 342 and 344.

As illustrated in FIGS. 2 and 3, the signal received by a mobile unit from a base station may have traveled a direct line-of-sight path, or some other longer path with excess delay over what the direct line-of-sight path travel time would be. However, the mobile unit measures the time of arrival and does not know if the received signal traveled a direct line-of-sight path or a different path with an associated delay. And even if it is known that the received signal did not travel the direct line-of-sight path, there is no way for the mobile unit to know the distance of the path actually traveled by the signal. Moreover, the path traveled by the signal can change as objects, and the mobile unit, move about.

Figure 4:
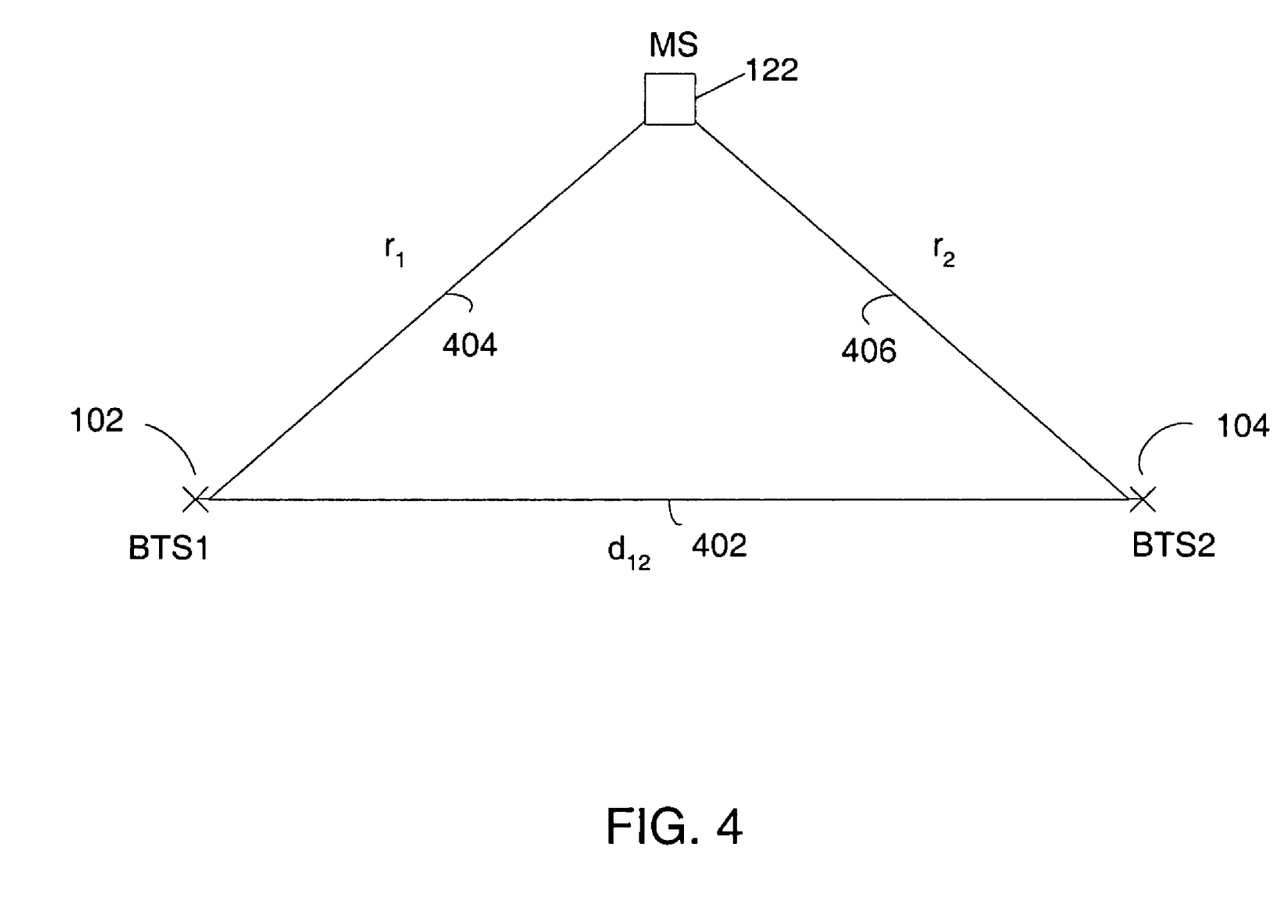
FIG. 4 is a block diagram illustrating the temporal relation between a first base station, a second base station, and a mobile unit.

FIG. 4 is a block diagram illustrating the temporal relation between the first base station 102, the second base station 104, and the mobile unit 122. It should be understood that the speed of the signals travelling from point to point will be assumed constant for all points. The time required for a signal to travel the distance between the first base station (BTS1) 102 and the second base station (BTS2) 104 is represented by a line 402 that is designated $d_{12}$. The time required for a signal to travel the distance from the first base station 102 to the mobile unit 122 is represented by a line 404 that is designated $r_1$. Likewise, the time required for a signal to travel the distance from the second base station 104 to the mobile unit 122 is represented by a line 406 that is designated $r_2$.

If the signals received at the mobile unit 122 are transmitted from the two base stations 102 and 104 at the same time, then the time difference of arrival (TDOA), the difference in arrival times for the received signals, indicates the difference between the distance of the mobile unit to the first and second base station represented by $r_1$ and $r_2$ respectively. Even if the signals transmitted from the two base stations are not transmitted at the same time, if they are synchronized to each other, with a known timing relationship, their TDOA can be calculated.

For example, in a system based on industry standard IS-95, each neighboring base station transmits a pilot signal that is coded with the same psuedorandom, or PN, code. To allow a mobile unit to discriminate between signals from neighboring base stations, the PN code from each base station pilot signal has a different phase (is delayed in time) from the pilot signal of neighboring base stations. Because the phase, or time delay, between base stations is fixed, the relative delay can be subtracted out from the TDOA measurement. Therefore, to simplify the following description it is assumed that signals are transmitted from each base station at the same time. Nevertheless, it should be understood that all that is required is a known relationship between the timing of the signals transmitted by the base stations.

Referring again to FIG. 4, there are several geometric constraints for the TDOA technique of the present invention. First, if there are no receiver timing and estimation errors then the excess delay in a signal path is always a positive value. This can be understood by considering the limiting case when there is no excess delay. If there is no excess delay then the time required for the signal to travel from the base station to the mobile unit is the shortest duration because the signal has traveled the shortest, or direct line-of-sight, path to the mobile unit. Thus, if there are no timing or estimation errors, any other path will be longer that the direct line-of-sight path, resulting in a corresponding longer, positive, excess delay.

Second, the absolute value of each TDOA measurement is upper bounded by the time it would take a signal to travel from one base station to the other base station along a lineof-sight path. This is due to the geometric triangle inequality that states that no one side of a triangle can be longer than, or equal to, the sum of the other two sides of the triangle, or conversely, any side of a triangle is longer than, or equal to, the difference between the other two sides of the triangle.

Although the excess delay of the signals received from the base stations is not known, the technique described below can determine a lower bound for the excess delay. The lower bound for the excess delay can be used to improve the estimated location of the mobile unit. The lower bound for the excess delay represents the minimum excess delay that can exist and still satisfy all mathematical relationships for the timing of the signal and the excess delay as described below. The set of all lower bounds for the excess delay values for the received base station signals will be used to establish an improved mobile unit location estimate.

The technique will be described for a single TDOA measurement, as illustrated in FIG. 4, although the technique can be applied to any number of TDOA measurements. As shown in FIG. 4, the mobile unit 122 is receiving signals, for example pilot signals in an IS-95 based system, from two base stations 102 and 104. The signals received from these two base stations result in a single TDOA measurement comprising the difference in elapsed time for the signal to travel from each base station to the mobile unit. As previously described, $r_1$, and $r_2$ are the time required for the signal to travel the distances from the first and second base station respectively to the mobile unit 122, and $d_{12}$ is the time required for the signal to travel the known line of sight distance between the two base stations. As shown in FIG. 4, line segments $r_1$, $r_2$, and $d_{12}$ form a triangle. This gives the following constraint of Equation 1:

$$-d_{12} \leq r_1 - r_2 \leq d_{12} \qquad [1]$$

Let $x_1$ and $x_2$ represent the excess delay of the signal time of arrival at the mobile unit 122 of the signals transmitted by the first base station 102 and the second base station 104 respectively. It should be apparent that the $x_1$ and $x_2$ values are not known because the actual path traveled by the signals is not known. As discussed previously, $x_1$ and $x_2$ are positive values, expressed as $x_1 \geq 0$, and $x_2 \geq 0$. Also, let the time bias, or time offset between the mobile unit and base station clock times, of the mobile unit 122 be represented by $t_b$. Typically, the time bias is constant for all measurements, at least in a relatively short period such as used to make a TDOA measurement. Then, the time difference of arrival measured at the mobile unit for signals received from the two base stations 102 and 104 is represented mathematically as Equation 2:

$$TDOA_{12} = TOA_1 - TOA_2 = (r_1 + x_1 + t_b) - (r_2 + x_2 + t_b) = (r_1 + x_1) - (r_2 + x_2) \qquad [2]$$

Where:
$TDOA_{12}$ is the time difference of arrival between signals from base station 1 and base station 2 as measured at the mobile unit.
$TOA_1$ is the time of arrival of the signal from base station 1 as measured at the mobile unit.
$TOA_2$ is the time of arrival of the signal from base station 2 as measured as the mobile unit.

By replacing the two inequalities of Equation [1] into Equation [2] the following inequalities are derived:

$$x_1 - x_2 = TDOA_{12} - (r_1 - r_2) \geq TDOA_{12} - d_{12} \qquad [3a]$$

$$x_2 - x_1 = (r_1 - r_2) - TDOA_{12} \geq -d_{12} - TDOA_{12} \qquad [3b]$$

To determine lower bounds for the excess delay terms $x_i$ for $i=1, 2$, a solution to the Equations of [3a] and [3b] are determined with the additional constraint that $x_i \geq 0$, because as already mentioned, the excess delay is positive.

The technique just described can be expanded to the general case where there are N base stations. Each pair of i and j measurements, from i and j base stations respectively, form two sets of inequalities, similar to Equations [3a] and [3b], as shown below in Equations [4a] and [4b]:

$$x_i - x_j = TDOA_{ij} - (r_i - r_j) \geq TDOA_{ij} - d_{ij} \qquad [4a]$$

$$x_j - x_i = (r_i - r_j) - TDOA_{ij} \geq -d_{ij} - TDOA_{ij} \qquad [4b]$$

Thus, for N base stations there are (N−1)*N/2 sets of inequalities, as illustrated in Equations [4a] and [4b], resulting in a total of M=(N−1)*N inequalities. The sets of inequalities can be written in matrix format as Equation 5:

$$Ax \geq b \qquad [5]$$

Where:
A is an M by N matrix; and
b is a column vector with M components.

The inequalities of Equation [5] can be solved, with the constraint of all excess delay values $x \geq 0$, to find minimum values for the unknowns $x_i$ and $x_j$. One method of solving these inequalities is to define a cost vector c with N components. The cost vector is then solved for $i=1, \ldots, N$ cases where the vector c is a vector of zeros, with a 1 in the $i^{th}$ place. This reduces the problem of minimizing cx, subject to $x \geq 0$ and $Ax \geq b$. Those skilled in the art will recognize that the solution may be determined by techniques for solving linear inequalities, such as can be found in the literature, for example, Strang and Gilbert, "Linear Algebra and its Applications", chapter 8, third edition, Harcourt Brace Jovanovish, 1998, incorporated herein.

A simple numeric example illustrates one method of how the lower bound may be determined. In this example, the measured $TDOA_{12}=5$ time units, and the time required for the signal to travel the known line-of-sight distance between the two base stations is $d_{12}=4$ time units. Substituting the values for $TDOA_{12}$ and $d_{12}$ into the inequalities of Equations [3a] and [3b] results in Equations [6a] and [6b]:

$$x_1 - x_2 \geq 5 - 4 = 1 \qquad [6a]$$

$$x_2 - x_1 \geq -4 - 5 = -9 \qquad [6b]$$

These inequalities, along with the constrain that $x_1 \geq 0$, and $x_2 \geq 0$, define a feasible set, a set composed of the solutions to the family of linear inequalities listed for this example.

Figure 5:
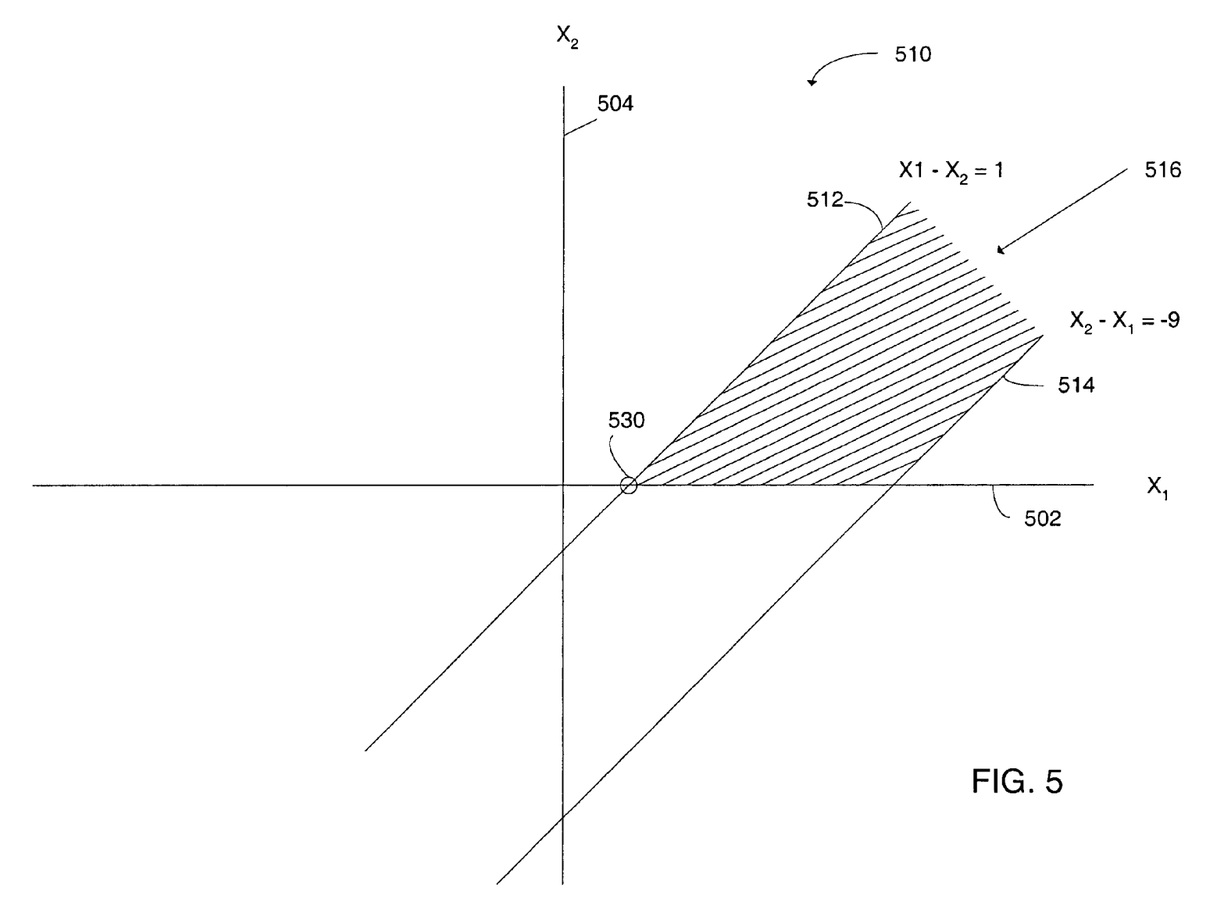
FIG. 5 is a graph illustrating an example of a feasible set.

FIG. 5 is a graph illustrating the feasible set for the above example. As shown in FIG. 5, there are two axes, one representing the values of $x_1$ (line 502), and the other representing values of $x_2$ (line 504), defining four quadrants. The upper right quadrant 510 contains values that satisfy the inequalities, $x_1 \geq 0$, and $x_2 \geq 0$, and are therefore possible members of the feasible set. The further constraints on $x_1$ and $x_2$ establish additional bounds on the feasible set. These additional bounds are shown as the regions defined by the inequalities $x_1 - x_2 \geq 1$, and $x_2 - x_1 \geq -9$. The inequality $x_1 - x_2 \geq 1$ defines a region of possible solutions downward and to the right of a line $x_1 - x_2 = 1$ (512). The inequality $x_2 - x_1 \geq -9$ defines a region of possible solution upward and to the left of a line $x_2 - x_1 = -9$ (514). The set of points that satisfy all the inequalities, thereby defining the feasible set, is the shaded area 516 of FIG. 5.

To determine the lower bound of the excess delay, a cost function is minimized. In the example, where there are signals from two base stations there are two cost functions, $c_1 = x_1$, and $c_2 = x_2$. Solving the minimum cost for each of the two cost functions, and satisfying the inequalities that defined the feasible set, results in the minimum cost occurring at point 530 where $x_1(min)=1$ and $x_2(min)=0$. Thus, in this example there is a lower bound of excess delay of 1 time unit on $TOA_1$, and a lower bound of excess delay of 0 time unit on $TOA_2$.

After the lower bounds for the excess delay have been determined, they may be used to improve the estimate of the mobile unit's location when using a TDOA estimation of location. For example, the lower bound of excess delay value could be subtracted from the respective time of arrival (TOA) measurements, before the estimated location is determined, thereby reducing the errors in the TOA measurements that are used to estimate location. The lower bound of excess delay values could also be used to determine weighting factors, used to give increased preference, or weights, to some of the received signal measurements in determining the location solution. The lower bound of excess delay values could also be used to discard a measurement entirely, for example, if the lower bound of excess delay value of a measurement exceeds a threshold, then the measurement may not be used in the location estimate solution. In addition the lower bound of excess delay value could be used in determining an indication of the accuracy of the location solution. These examples of how to use the lower bound of excess delay values, as well as others, can be used independently or in any combination. In addition, the uses of the lower bound of excess delay values can be used by the mobile unit, transmitted to another location in the cellular infrastructure such as the base station for use there, or used at both the mobile unit and the other location in the cellular infrastructure.

Figure 6:
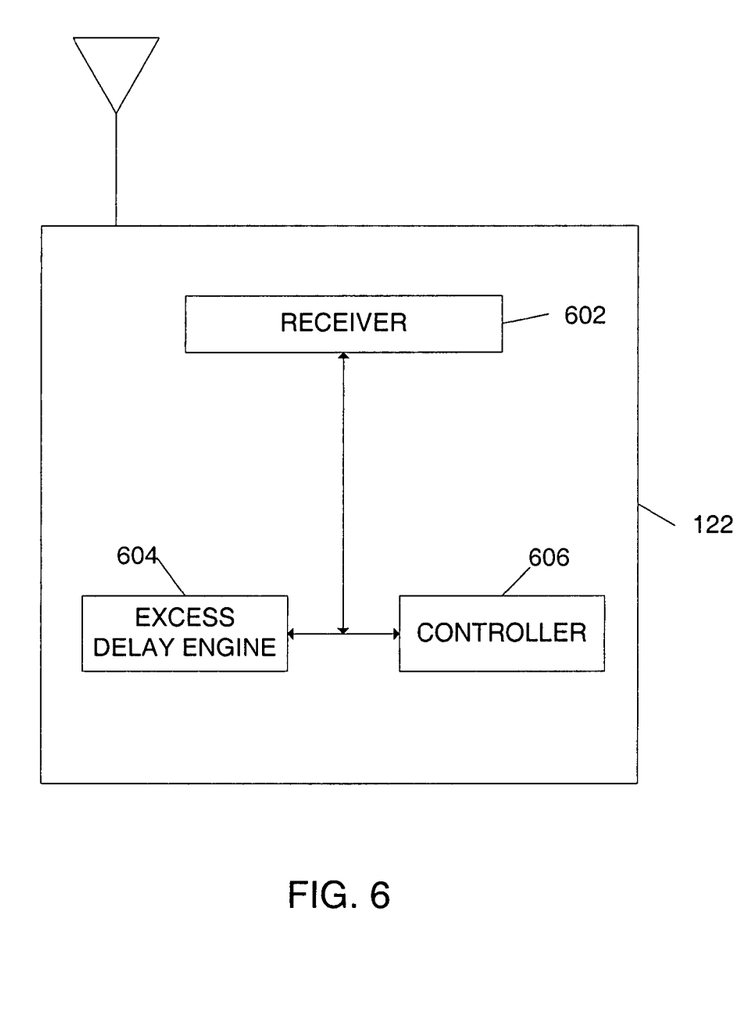
FIG. 6 is a block diagram illustrating additional detail of a mobile unit.

FIG. 6 is a block diagram illustrating additional detail of the mobile unit 122. The mobile unit 122 includes a receiver 602 configured to receive signals from base stations. For example, the receiver may be configured to receive code division multiple access (CDMA) signals, or global system for mobile communication (GSM) from a base station. The receiver 602 receives signals from the base stations and determines the TOA for each signals. The receiver outputs the TOA of the received signals to the excess delay engine 604.

The excess delay engine 604 accepts the TOA of the received signals and determines the lower bounds of the excess delay for each of the received signals. The lower bounds of the excess delay may be output to a controller 606 where they are used in location determination. In addition, the TOA of the received signals or the lower bounds of the excess delay may be communicated to a different location, for example a base station and used at the base station. In one embodiment, the excess delay engine 604 may be part of the controller 606. In another embodiment, the excess delay engine 604 may be part of the receiver 602. In yet another embodiment, the receiver 602, excess delay engine 604, and controller 606 are combined into a single unit. The receiver 602, excess delay engine 604, and controller 606 may be made form an application specific integrated circuit (ASIC), a field programmable gate array (FPGA), a gate array, or discrete components. In other embodiments, the functions of the receiver 602, excess delay engine 604, and controller 606 may be implemented in software, or any combination of hardware and software.

Figure 7:
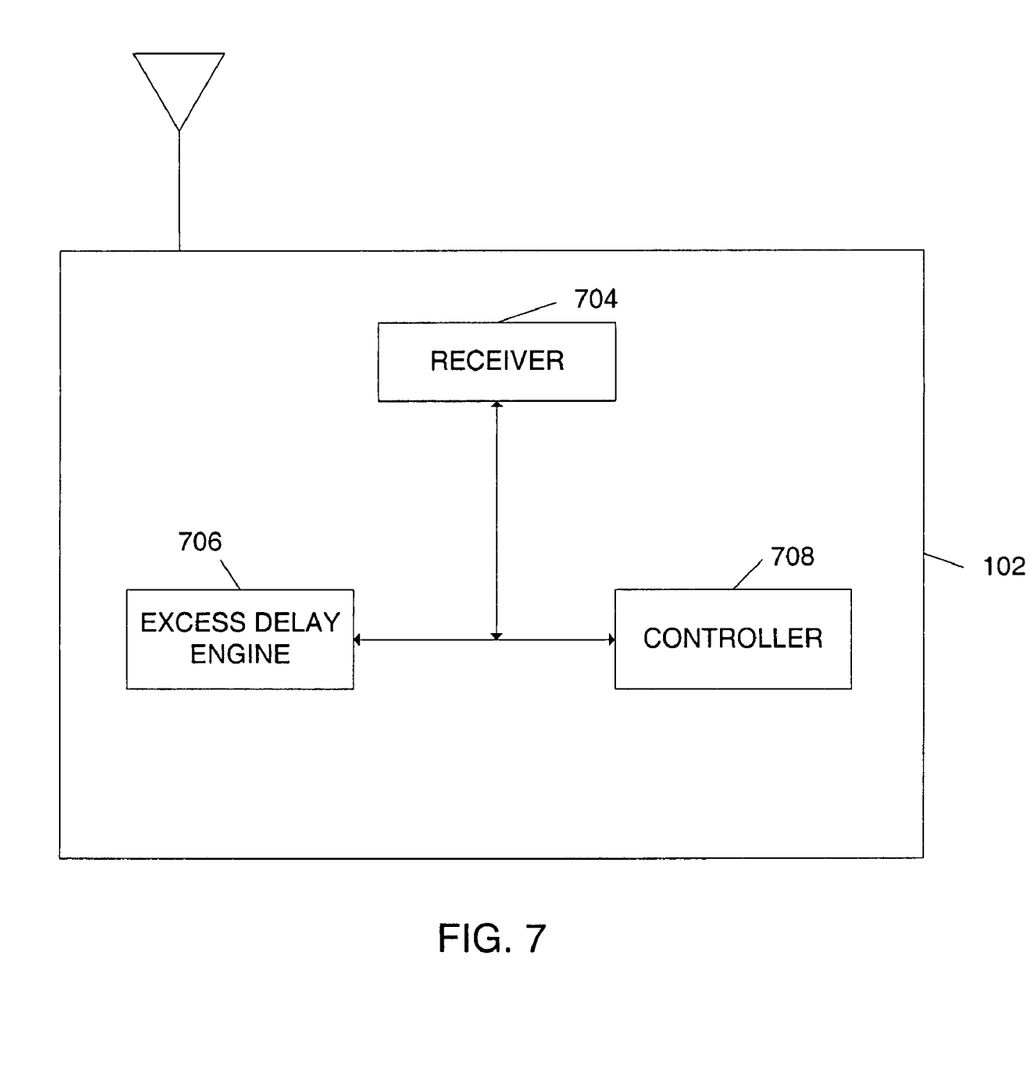
FIG. 7 is a block diagram of a base station.

FIG. 7 is a block diagram illustrating additional detail of the base station 102. In an alternative embodiment, the mobile unit transmits the TOA measurements of the signals received by the mobile unit to a base station where the estimate of the location of the mobile unit are made. In this embodiment, the base station 102 includes a receiver 704 configured to receive signals from a mobile unit. For example, the received may be configured to receive code division multiple access (CDMA) signals, or global system for mobile communication (GSM) from a mobile unit. The receiver 704 receives TOA measure-ments of signals received by the mobile unit. The receiver 704 outputs the TOA of the signals received by the mobile unit to an excess delay engine 706.

The excess delay engine 706 accepts the TOA signals received from the mobile unit and determines the lower bounds of the excess delay for each of the received signals. The lower bounds of the excess delay may be output to a controller 708 where they are used in determining an estimate of the location of the mobile unit. In one embodiment, the excess delay engine 706 may be part of the controller 708. In another embodiment, the excess delay engine 706 may be part of the receiver 704. In yet another embodiment, the receiver 704, excess delay engine 706, and controller 708 are combined into a single unit. The transmitter 702, receiver 704, excess delay engine 706, and controller 708 may be made form an application specific integrated circuit (ASIC), a field programmable gate array (FPGA), a gate array, or discrete components. In other embodiments, the functions of the transmitter 702, receiver 704, excess delay engine 706, and controller 708 may be implemented in software, or any combination of hardware and software.

While FIG. 7 illustrates a base station, the excess delay engine could be located anywhere in the cellular infrastructure. For example, the excess delay engine could be included in a base station controller (BSC) or a mobile switching center (MSC). In one embodiment, the excess delay engine is part of a position determination engine (PDE) that estimates the location of the mobile unit.

In another alternative embodiment, the mobile unit determines the lower bounds of excess delay and transmits the value for the lower bound of excess delay to the base station 102. In this embodiment, the receiver 702 receives the value of the lower bound of excess delay determined by the mobile unit and outputs the value to the controller 708 where the value is used in determining an estimate of the location of the mobile unit.

Figure 8:
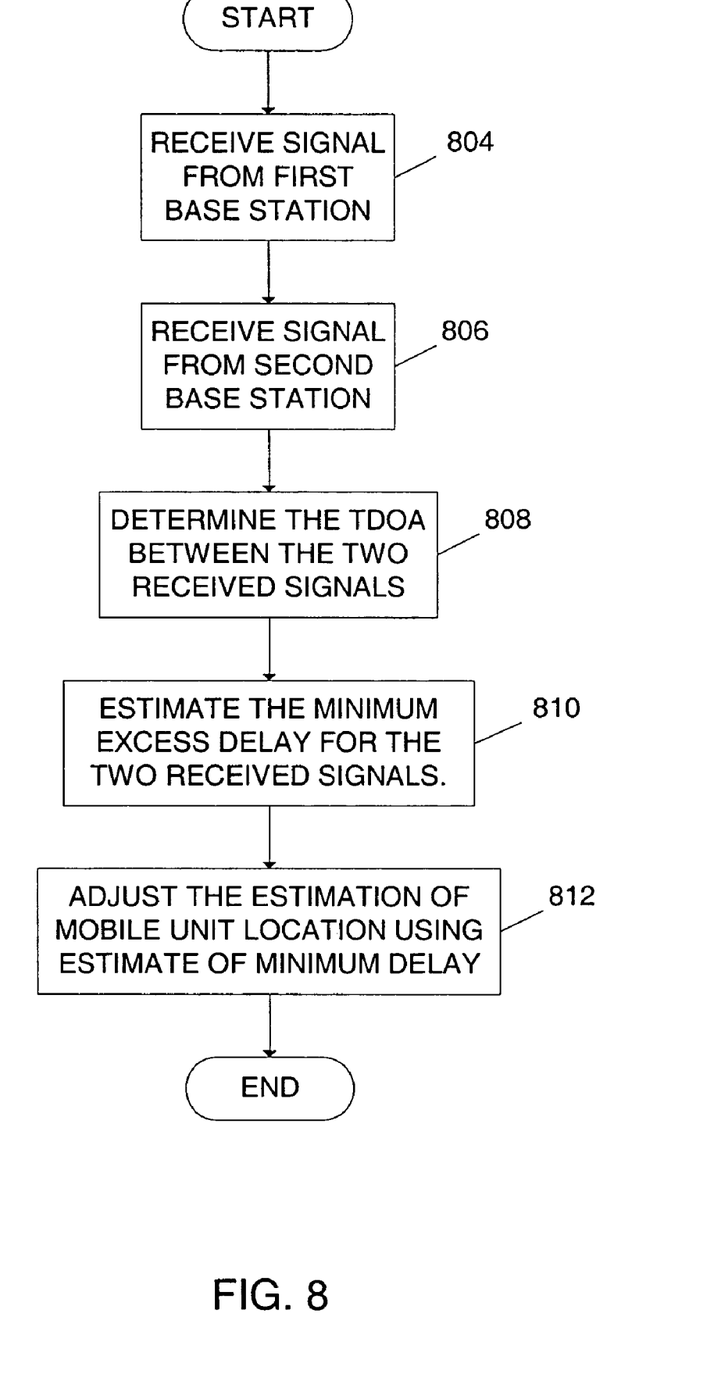
FIG. 8 is a flow chart illustrating one technique of determining the lower bound of excess delay by a mobile unit.

FIG. 8 is a flow chart illustrating one technique of determining the lower bound of excess delay by a mobile unit. The flow chart represents operations performed by the mobile unit 122. While FIG. 8 describes an example of the technique where the remote unit receives signals from two base stations, in an actual system the mobile unit may receive signals from any number of base stations. Operation flow begins in block 804, when a signal is received from a first base station at the mobile unit. Flow then continues to block 806. In block 806 a signal is received from a second base station. While the example illustrated in FIG. 8 describes the signals being received sequentially, in a typical communication system the signals from all base stations are received simultaneously.

Flow then continues to block 808. In block 808 the TDOA of the two received signals is determined. Flow then continues to block 810, where the lower bound of excess delay for the received signals is determined. Flow then continues to block 812. In block 812 the location of the mobile unit is estimated, with the TDOA estimate adjusted using the lower bound of excess delay.

Figure 9:
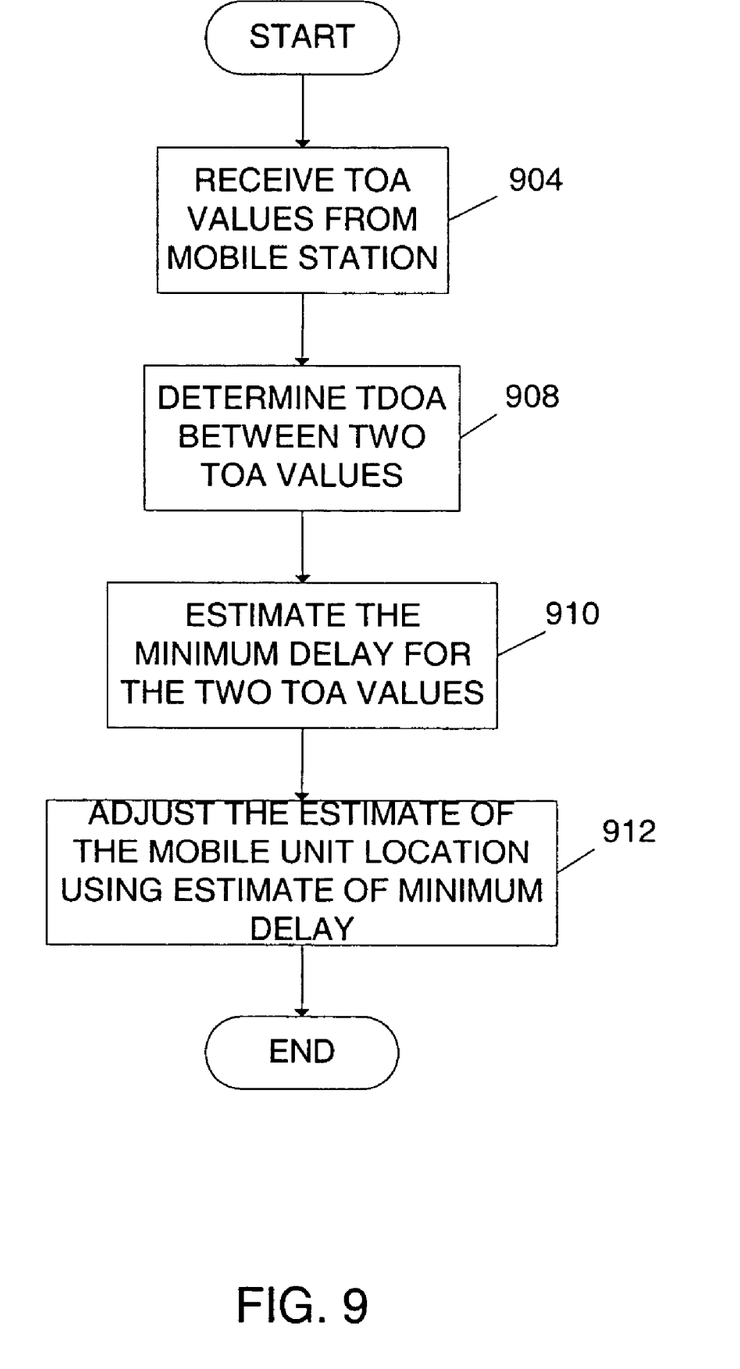
FIG. 9 is a flow chart illustrating one technique of determining the lower bound of excess delay by a base station.

FIG. 9 is a flow chart illustrating one technique of determining the lower bound of excess delay by at a location in the cellular network other than the mobile unit. For example, the technique described in FIG. 9 could be included in a base station, a mobile switching center, or as part of a position determination engine. While FIG. 9 describes an example of the technique where the remote unit receives signals from two base stations, in an actual system the mobile unit may receive signals from any number of base stations. Operation flow begins in block 904, when TOA values of signals received at a mobile unit from at least two base stations are received at the base station from the mobile unit. While the flow chart describes the operation in relationship to one mobile unit, the base station is able to perform the operation in relationship to many mobile units.

Flow then continues to block 908. In block 908 the TDOA of two of the received TOA values is determined. Flow then continues to block 910, where the lower bound of the excess delay is determined. Flow then continues to block 912. In block 912 the location of the mobile unit is estimated, with the TDOA estimate adjusted using the lower bound of excess delay.

The foregoing description has described examples of certain embodiments of the invention where the estimate of the mobile units location is done by time difference of arrival measurements of signals transmitted from base stations. The techniques described can also be used in combination with other position location systems. For example, the technique could be used to supplement a global positioning system (GPS), or other position location system, creating a hybrid system that combines measurements from the different measurement systems to estimate the mobile unit location. In addition, the techniques described could be used to correct the time bias of a reference used for the GPS measurements.

The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come with the meaning and range of equivalency of the claims are to be embraced within their scope.

I claim:

1. A mobile unit comprising:
    a receiver configured to receive respective signals from at least two base stations, and to determine a time of arrival of the signals transmitted by each base station; and
    an excess delay engine configured to receive the time of arrival of the signals and to estimate a lower bound of excess delay in accordance with the time of arrival of the signals from their respective base stations and known distances between the base stations, and wherein the mobile unit is configured to provide estimated location information of the mobile unit determined in accordance with the estimated lower bound of excess delay and the time difference of arrival between the received signals.

2. A mobile unit as defined in claim 1, wherein the received signals are CDMA pilot signals.

3. A mobile unit as defined in claim 1, wherein the received signals are GSM signals.

4. A mobile unit as defined in claim 1, wherein the estimated location information comprises information indicative of a location determined using a difference between the lower bound of excess delay and the time of arrival measurement.

5. A mobile unit as defined in claim 1, wherein the estimated location information includes a location determined by weighting the time of arrival measurements according to the lower bound of excess delay.

6. A mobile unit as defined in claim 1, wherein the estimated location information includes a location determined by eliminating a time of arrival measurement from the location estimate based on the lower bound of excess delay.

7. A mobile unit as defined in claim 1, wherein the estimated location information comprises a location determined using the time of arrival measurements and an accuracy determined using the lower bound of excess delay for the received signals.

8. A mobile unit as defined in claim 1, wherein at least some of the estimated location information is determined by the mobile unit and transmitted to a base station.

9. A mobile unit as defined in claim 1, wherein the estimated location information of the mobile unit includes information obtained from another position location system.

10. A mobile unit as defined in claim 9, wherein the other position location system is a global positioning system.

11. A mobile unit as defined in claim 1, wherein the mobile unit is further configured to transmit the lower bound of excess delay of the received signals to one of the base stations.

12. A mobile unit as defined in claim 1, wherein the excess delay comprises delay introduced into the signal due to multipath signal propagation.

13. A mobile unit as defined in claim 1, wherein the mobile unit is configured to transmit signals to and receive signals from a communication system.

14. A mobile unit as defined in claim 1, wherein the mobile unit configured to transmit signals to and receive signals from a cellular communication system.

15. A mobile unit as defined in claim 1 wherein the estimated lower bound of excess delay is determined using less than all of the signals received from the base stations.

16. A mobile unit comprising:
    a receiver configured to receive respective signals from at least two base stations, and to determine a time of arrival of the signals transmitted by each base station; and
    a transmitter configured to accept the time of arrival and to transmit the time of arrival to a different location, wherein the different location further comprises an excess delay engine configured to receive the time of arrival and estimate a lower bound of excess delay in accordance with the time of arrival of the signal from its respective base station and a known distance between the base stations, and configured to estimate a location of the mobile unit in accordance with the estimated lower bound of excess delay and the time difference of arrival between the received signals.

17. A cellular network including one or more elements of cellular infrastructure, the network comprising:
    a receiver configured to receive signals from at least one mobile unit, wherein the signals received from the at least one mobile unit comprise the times of arrival of signals received by the mobile unit from at least two base stations; and
    an excess delay engine configured to receive the times of arrival of the signals and to estimate a lower bound of excess delay for the times of arrival of the signals from their respective base stations wherein the base stations are located known distances apart, and wherein estimated location information of the mobile unit is determined in accordance with the estimated lower bound of excess delay and time difference of arrival between the received signals.

18. A network as defined in claim 17, wherein the estimated location information of the mobile unit is determined by subtracting the lower hound of excess delay from the time of arrival measurement of the respective signal.

19. A network as defined in claim 17, wherein the estimated location information of the mobile unit is determined by weighting the time of arrival measurements according to the lower bound of excess delay.

20. A network as defined in claim 17, wherein the estimated location information of the mobile united is determined by eliminating, a time of arrival measurement from the location estimate based on the lower bound of excess delay.

21. A network as defined in claim 17, wherein the estimated location information includes an accuracy of the estimated location of the mobile unit determined using the lower bound of excess delay for the received signals.

22. A network as defined in claim 17 wherein, estimating the lower bound of excess delay is estimated using fewer than all of the signals received from the mobile unit.

23. A network as defined in claim 17, wherein the estimated location information includes information obtained from another position location system.

24. A network as defined in claim 23, wherein the other position location system is a global positioning system.

25. The network of claim 17, wherein the one or more elements of cellular infrastructure includes a base station configured to directly receive the signals from the at least one mobile unit.

26. The network of claim 17, wherein the one or more elements of cellular infrastructure includes a mobile switching center (MSC) and/or a position determining entity (PDE) including a receiver configured to indirectly receive the signals from the at least one mobile unit.

27. An integrated circuit configured to determine a lower bound of an excess delay in a time of arrival measurement of a received signal, the integrated circuit comprising:
 a input circuit configured to receive signal information from at least two base stations and to output a time of arrival measurement for each received signal at a mobile station;
 an excess delay engine configured to determine a time difference of arrival between the received signals from the respective base stations, and to estimate a lower bound of excess delay introduced into the signals received from each base station based on the time of arrival of each signal from its respective base station and a known distance between two associated base stations, and
 position information circuitry configured to determine position information associated with the mobile station based on the estimated lower bound of excess delay and the time difference of arrival between at least some of the received signals from the respective base stations.

28. An integrated circuit as defined in claim 27, wherein the received signals are CDMA pilot signals.

29. An integrated circuit as defined in claim 27, wherein the received signals are GSM signals.

30. An integrated circuit as defined in claim 27, wherein the position circuitry is configured to determine the position information by subtracting the lower bound of excess delay from the time of arrival measurement.

31. An integrated circuit as defined in claim 27, wherein the position circuitry is configured to determine the position information by weighting the time of arrival measurements according to the lower bound of excess delay.

32. An integrated circuit as defined in claim 27, wherein the position circuitry is configured to determine the position information by eliminating a time of arrival measurement from the estimated location based on the lower bound of excess delay.

33. An integrated circuit as defined in claim 27, wherein the position information comprises an accuracy of the estimated location of the mobile unit determined using the lower bound of excess delay for the received signals.

34. An integrated circuit as defined in claim 27, wherein the position circuitry is configured to determine the position information using information obtained using another position location system.

35. An integrated circuit as defined in claim 34, wherein the another position location system is a global positioning system.

36. An apparatus comprising:
 means for receiving signal information from at least two base stations and for outputting a time of arrival measurement for each received signal at a mobile station;
 means for determining a time difference of arrival between the received signals from the respective base stations, and for estimating a lower bound of excess delay introduced into the signals received from each base station based on the time of arrival of each signal from its respective base station and a known distance between two associated base stations, and
 means for determining position information associated with the mobile station based on the estimated lower bound of excess delay and the time difference of arrival between at least some of the received signals from the respective base stations.

* * * * *